B. G. BEADLE.
COTTON GIN.

No. 25,943. Patented Nov. 1, 1859.

Witnesses:
A. B. Stoughton
Thos. H. Upperman

Inventor:
Benjamin G. Beadle

UNITED STATES PATENT OFFICE.

BENJAMIN G. BEADLE, OF MEMPHIS, TENNESSEE.

IMPROVEMENT IN COTTON-GINS.

Specification forming part of Letters Patent No. 25,943, dated November 1, 1859.

*To all whom it may concern:*

Be it known that I, BENJAMIN G. BEADLE, of Memphis, in the county of Shelby and State of Tennessee, have invented certain new and useful Improvements in Cotton - Gins; and I do hereby declare the following to be a full, clear, and exact description of the construction and operation of the same, reference being had to the accompanying drawings, making a part of this specification, in which—

Figure 1:
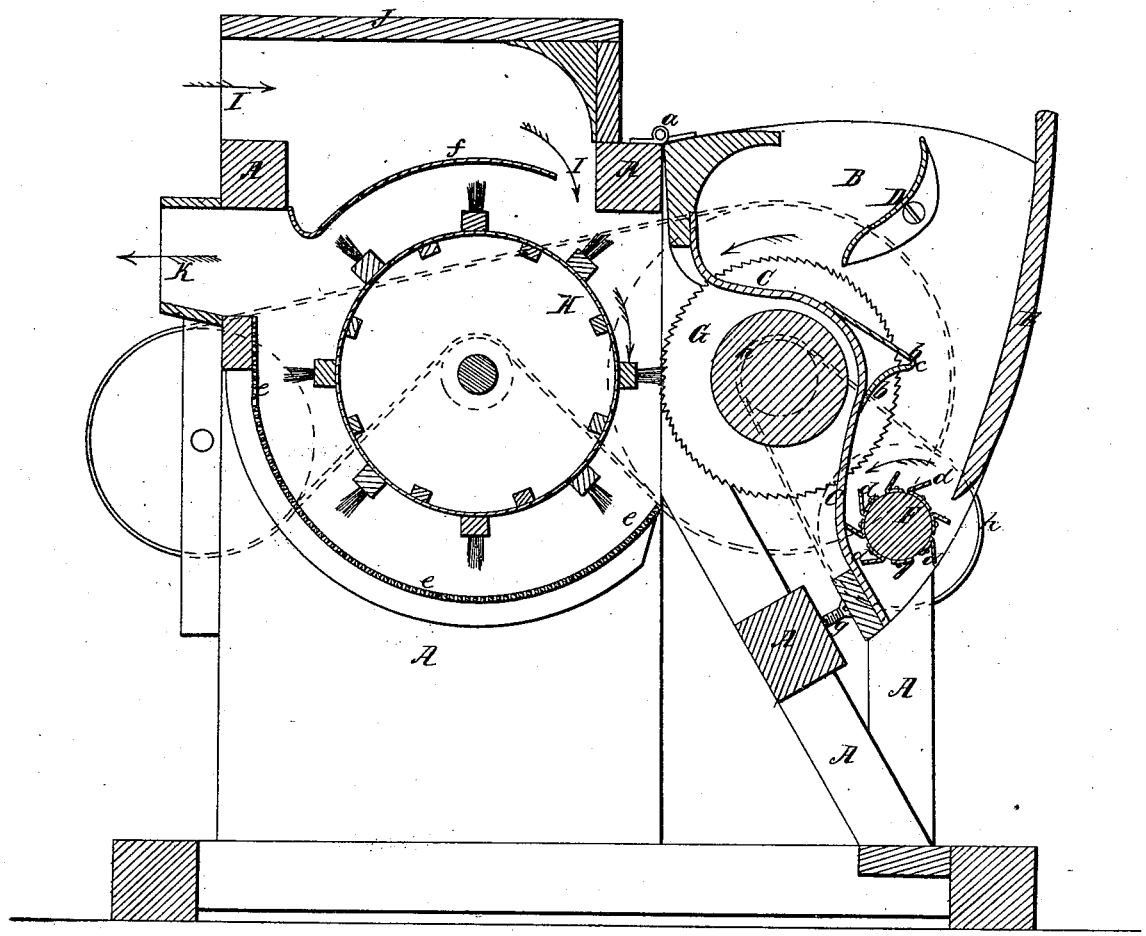
Figure 2:
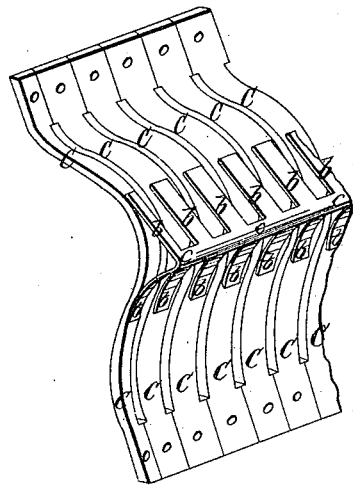

Figure 1 represents a vertical central transverse section through the cotton-gin; and Fig. 2 represents a portion of the ribs detached from the gin, to show the manner of connecting the knuckle projections thereto.

My invention relates to the details of the gin, my purpose and object being to prevent the pods from passing the ribs, as much as can possibly be done, and to separate from the cotton such minute pieces of the pods or other impurities as will unavoidably be carried past the ribs, and not allow them to pass out with the cotton, but to take them to another delivery, and thus producing cleaner and consequently a more merchantable fiber.

To enable others skilled in the art to make and use my invention, I will proceed to describe the same with reference to the drawings.

A represents the gin - frame, to which is hinged at $a$ the hopper B, so that it may be swung out of the way to reach the saw-cylinder. That side of the hopper next the saw-cylinder is composed of series of ribs C, between which the saws project, as seen in Fig. 1. To each of these ribs is united one of a series of knuckles or projecting pieces, $b$, the whole series being in turn united at their outermost projecting portions by a strip, rib, or brace, $c$, that keeps them all in proper position. The knuckle itself has heretofore been used; but they have not hitherto been united to a common brace, back, or support to keep them true to their places.

D is a guide or director in the hopper, to keep the hulls, stems, &c., from the cotton that is to be cleaned. The front board, E, of the hopper is made removable, so as to clean out the hopper.

F is a cylinder at the lower end of the hopper, rotating in the direction shown by the red arrow. Its duty is to throw out the seeds, hulls, and stems, and is furnished with inclined ribs $d$, having saw or comb teeth on their edges.

G is the saw and H the brush cylinders, working together in the usual manner. The knuckles $b$ on the ribs prevent the seeds, hulls, and stems from being carried up where they would be acted upon by the saws and cut or rasped, and the impurities thus made carried into the gin and mixed with the cotton. The brush-cylinder H is partially inclosed—that is to say, it is inclosed in an outer case—except for the inlet and exit openings of the fiber, and the inlet and exit openings for a blast of air, which it creates to blow out the finer impurities which find their way through or past the ribs of this outer case, $e$, is of woven wire or perforated metal or wood, through which the finer impurities are carried by the blast; and $f$ is a close plate or shield over the top, for forming an air trunk or passage, I, through which the air is to enter.

A set-screw, $g$, is arranged at the bottom of the hopper, for the purpose of adjusting the ribs to the saws, the hopper being held against it, when the gin is in operation, by the band or belt $h$, passing around the pulleys on the saw-cylinder G, and the clearing-cylinder F, the latter cylinder being hung in the hopper. The belt $h$ must be shipped when it is desired to raise up the hopper on its hinges.

J is a cap or cover, which forms the top and sides of the air-passage I, and this cover may be removable for the purpose of getting at the inside of the gin for cleaning or repairs.

The cleaned cotton is blown out at the opening K. The finer impurities are blown through the open concave $e$ below the brush-cylinder, and the larger impurities—such as seeds, leaves, hulls, or stems—are thrown out of the hopper by the revolving comb-cylinder F. The rotation of the brush-cylinder creates the blast, which is drawn in at and through the passage I, and a portion of the volume of air is driven through the meshes or openings of the concave $e$, the remaining portion carrying out the ginned cotton through the exit K.

The operation of the gin will be readily understood from the above description, together with the drawings and the arrows thereon, which show the direction of rotation of the several cylinders, as well as the direction of the current of air.

Having thus fully described the nature and object of my invention, what I claim therein as new, and desire to secure by Letters Patent, is—

Uniting the knuckles or projections *b* on the ribs by a back or brace, *c*, extending throughout the series, for the purpose of strength and for keeping them in proper position, substantially as set forth.

BENJAMIN G. BEADLE.

Witnesses:
A. B. STOUGHTON,
THOS. H. UPPERMAN.